United States Patent
Rhodes et al.

(10) Patent No.: US 8,629,631 B1
(45) Date of Patent: Jan. 14, 2014

(54) METHOD AND SYSTEM FOR IMPROVING START-UP TIME OF A LIGHT EMITTING DIODE (LED) DRIVER AT REDUCED INPUT VOLTAGE

(75) Inventors: Scott Edward Rhodes, Sharpsburg, GA (US); William Thomas Hopkins, Dickson, TN (US)

(73) Assignee: Cooper Technologies Company, Houston, TX (US)

( * ) Notice: Subject to any disclaimer, the term of this patent is extended or adjusted under 35 U.S.C. 154(b) by 353 days.

(21) Appl. No.: 13/188,043

(22) Filed: Jul. 21, 2011

(51) Int. Cl.
*G05F 1/00* (2006.01)

(52) U.S. Cl.
USPC ........ 315/307; 315/291; 315/360; 315/227 R; 315/238; 315/239; 363/49; 363/97; 363/19; 363/21.07; 363/21.08

(58) Field of Classification Search
USPC ................. 315/291, 294, 297, 307, 224, 225, 315/227 R, 238, 239, 360; 363/49, 97, 19, 363/21.01, 21.05, 21.07, 21.08, 21.6, 21.12, 363/21.18; 323/901, 908, 287

See application file for complete search history.

(56) References Cited

U.S. PATENT DOCUMENTS

| | | | | |
|---|---|---|---|---|
| 7,636,246 B2* | 12/2009 | Huynh et al. | ............ | 363/21.09 |
| 7,894,219 B2* | 2/2011 | Zong et al. | ...................... | 363/49 |
| 7,986,537 B2* | 7/2011 | Nakamura | .................. | 363/56.1 |
| 8,064,231 B2* | 11/2011 | Fang et al. | ................. | 363/21.18 |
| 8,363,436 B2* | 1/2013 | Wang et al. | ..................... | 363/49 |
| 8,416,596 B2* | 4/2013 | Huang | ............................ | 363/97 |
| 8,456,867 B1* | 6/2013 | Karlsson et al. | ................ | 363/17 |

* cited by examiner

*Primary Examiner* — Haiss Philogene
(74) *Attorney, Agent, or Firm* — King & Spalding LLP

(57) ABSTRACT

Improving start-up time of a light emitting diode (led) driver at lower input voltage is accomplished with a quick start circuit comprising a constant current source that replaces the traditional trickle charge start-up path for charging of a Vcc capacitor supplying operating voltage to an SMPS controller. Also the constant current source will only be operational during SMPS start-up, then will turn off after the SMPS is capable of producing its own regulated power supply to the Vcc terminal of the SMPS controller, thereby minimizing $E^2/R$ power losses in the SMPS.

20 Claims, 4 Drawing Sheets

METHOD AND SYSTEM FOR IMPROVING START-UP TIME OF A LIGHT EMITTING DIODE (LED) DRIVER AT REDUCED INPUT VOLTAGE

TECHNICAL FIELD

The present invention relates to drivers for light emitting diode (LED) luminaires, and more specifically, the invention relates to improving the start-up time of a switch mode power supply (SMPS) used as a power supply driver for the LED luminaire.

BACKGROUND

A SMPS is used in many applications requiring a low cost single stage solution to provide isolated and regulated DC output power with good power factor correction and moderate line current distortion. The control circuit used for the SMPS is one developed for the SMPS boost topology that requires a second stage to provide isolation and output voltage scaling. These controllers are readily available and are low in cost, making them attractive for a low cost SMPS that may be used for consumer and commercial applications, e.g., voltage step-down supplies for lighting applications such as, for example but not limited to, light emitting diode (LED) luminaires, etc.

A SMPS integrated circuit controller may be, for example but is not limited to, a transition-mode power factor corrected (PFC) controller, such as device number L6562, manufactured by STMicroelectronics. The datasheet for the L6562 controller is available from STMicroelectronics at www.st.com, and is incorporated by reference herein for all purposes. The SMPS controller typically has voltage input for biasing the controller, Vcc, that has a turn-on threshold voltage, VTon, and a turn off voltage threshold, VToff, where VTon>VToff. This hysteresis between VTon and VToff allows for the Vcc capacitor to have enough stored energy such that the controller may start the switching of the SMPS, allowing for the energy processed by the SMPS to regenerate the Vcc bias capacitor sustaining operation into steady state operation. For the L6562, VTon=12.5 volts and VToff=10 volts. There are two paths for the Vcc power supply internal to the controller integrated circuit to derive source energy, the start-up path and the regenerative path. The start-up path is a circuit that will charge up a Vcc capacitor for operation of the controller above VTon such that the controller will start switching the power supply allowing it to process energy. As the controller starts switching the power converter, the controller consumes energy off the Vcc terminal resulting in the Vcc voltage to start falling. The regenerative path must then take some of this energy processed by the power converter and provide it to the Vcc capacitor such that the voltage does not fall below VToff. At this point the Vcc is stable in the power converter transitions into steady state operation.

When power is first applied to the SMPS, the power supply Vcc capacitor is trickle charged to a voltage sufficient to start operation of an SMPS integrated circuit controller. With the trickle charge method, a simple resistor is added from the power source to the Vcc storage capacitor such that when power is supplied to the controller circuits, current flows directly from the power source to the Vcc storage capacitor. This results in the Vcc voltage increasing until it reaches VTon, at which point the power converter starts to switch and process energy. Since the controller integrated circuit is now drawing energy, the Vcc voltage on the storage capacitor starts to fall as the controller integrated circuit drains current from the Vcc storage capacitor. As long as the regenerative path replenishes the energy on the Vcc storage capacitor before the Vcc voltage falls below VToff, the SMPS continues to run in an intended fashion.

If the power source voltage is constant, the SMPS designer may size the trickle charge resistor such that the power converter starts in a reasonable amount of time. The lower the resistance value the faster the circuit will start up by allowing more current to trickle charge to the Vcc capacitor. However, by using a lower resistance value more power is dissipated during steady state operation due to $E^2/R$ (power) losses. Therefore, there is an optimal value that equally balances start-up time and power losses.

Also, when the power supply is a LED driver that is dimmable by a line voltage dimmer, the power supply can suffer increased start-up times that are unreasonably delayed when the light is switched on with the dimmer in a reduced light output setting. This is because the dimmer dims the light by reducing the RMS voltage input to the LED driver SMPS. With the voltage available reduced to the trickle charge path, the amount of current available to charge the Vcc capacitor is reduced resulting in longer start-up times. With the dimmer at its minimum setting the start-up time can be as long as five minutes. This is clearly unacceptable to a end user wishing to turn their lights on.

SUMMARY

Therefore what is needed in a SMPS is a way to quickly reach a start-up voltage Vcc that is greater than VTon even at low dimmer output voltages. The aforementioned deficiencies and needs are addressed by using a quick start circuit comprising a constant current source that replaces the traditional trickle charge start-up path for charging of the Vcc capacitor. And, in addition, will only engage during SMPS start-up, then will turn off after the SMPS is capable of producing its own regulated power supply to the Vcc terminal of the controller integrated circuit. Thereby minimizing $E^2/R$ power losses in the SMPS.

According to a specific example embodiment of this disclosure, a switch mode power supply (SMPS) having improved start-up time at reduced input voltage comprises: a rectifier circuit for converting an alternating current (AC) power source to a direct current (DC) power source; a SMPS transformer having a primary winding thereof coupled to the DC power source and a controller supply winding for powering a SMPS controller; a power transistor switch coupled to the primary winding of the SMPS transformer; the SMPS controller having a drive output and a Vcc power supply input, wherein the drive output is coupled to the power transistor switch such that the SMPS controller controls when the power transistor switch turns on or off; a Vcc power supply capacitor coupled to the Vcc power supply input of the SMPS controller; a first rectifier diode coupled between the controller power winding of the SMPS transformer and the Vcc power supply capacitor; and a start-up constant current source coupled between the DC power source and the Vcc power supply capacitor, wherein the start-up constant current source provides a constant current charge to the Vcc power supply capacitor until a threshold voltage is, reached thereon, then the start-up constant current source shuts off and charging voltage to the Vcc power supply capacitor is supplied by the controller power supply winding of the SMPS transformer through the first rectifier diode.

According to another specific example embodiment of this disclosure, a switch mode power supply (SMPS) controller having improved start-up time at reduced input voltage comprises: the SMPS controller having a drive output and a Vcc power supply input, wherein the drive output is adapted for coupling to a power transistor switch such that the SMPS controller controls when the power transistor switch turns on or off; a Vcc power supply capacitor coupled to the Vcc power supply input of the SMPS controller; a first rectifier diode coupled between the controller power winding of a SMPS transformer and the Vcc power supply capacitor; and a start-up constant current source coupled between a DC power source and the Vcc power supply capacitor, wherein the start-up constant current source provides a constant current charge to the Vcc power supply capacitor until a threshold voltage is reached thereon, then the start-up constant current source shuts off and charging voltage to the Vcc power supply capacitor is supplied by the controller power supply winding of the SMPS transformer through the first rectifier diode.

According to yet another specific example embodiment of this disclosure, a method for improving start-up time of a switch mode power supply (SMPS) during reduced input voltage comprises the steps of: converting an alternating current (AC) power source to a direct current (DC) power source; providing a SMPS transformer having a primary winding thereof coupled to the DC power source and a controller supply winding for powering a SMPS controller; providing a power transistor switch coupled to the primary winding of the SMPS transformer; coupling a drive output of the SMPS controller to the power transistor switch such that the SMPS controller controls when the power transistor switch turns on or off; coupling a Vcc power supply input of the SMPS controller to a Vcc power supply capacitor; coupling a first rectifier diode between the controller power winding of the SMPS transformer and the Vcc power supply capacitor; and providing a start-up constant current source coupled between the DC power source and the Vcc power supply capacitor, wherein the start-up constant current source comprises the steps of providing a constant current charge to the Vcc power supply capacitor until a threshold voltage is reached thereon, and turning off the start-up constant current source once a charging voltage from the controller power supply winding of the SMPS transformer to the Vcc power supply capacitor is greater than the threshold voltage.

BRIEF DESCRIPTION OF THE DRAWINGS

For a more complete understanding of the present invention and the advantages thereof, reference is now made to the following description, in conjunction with the accompanying figures briefly described as follows.

Figure 1:
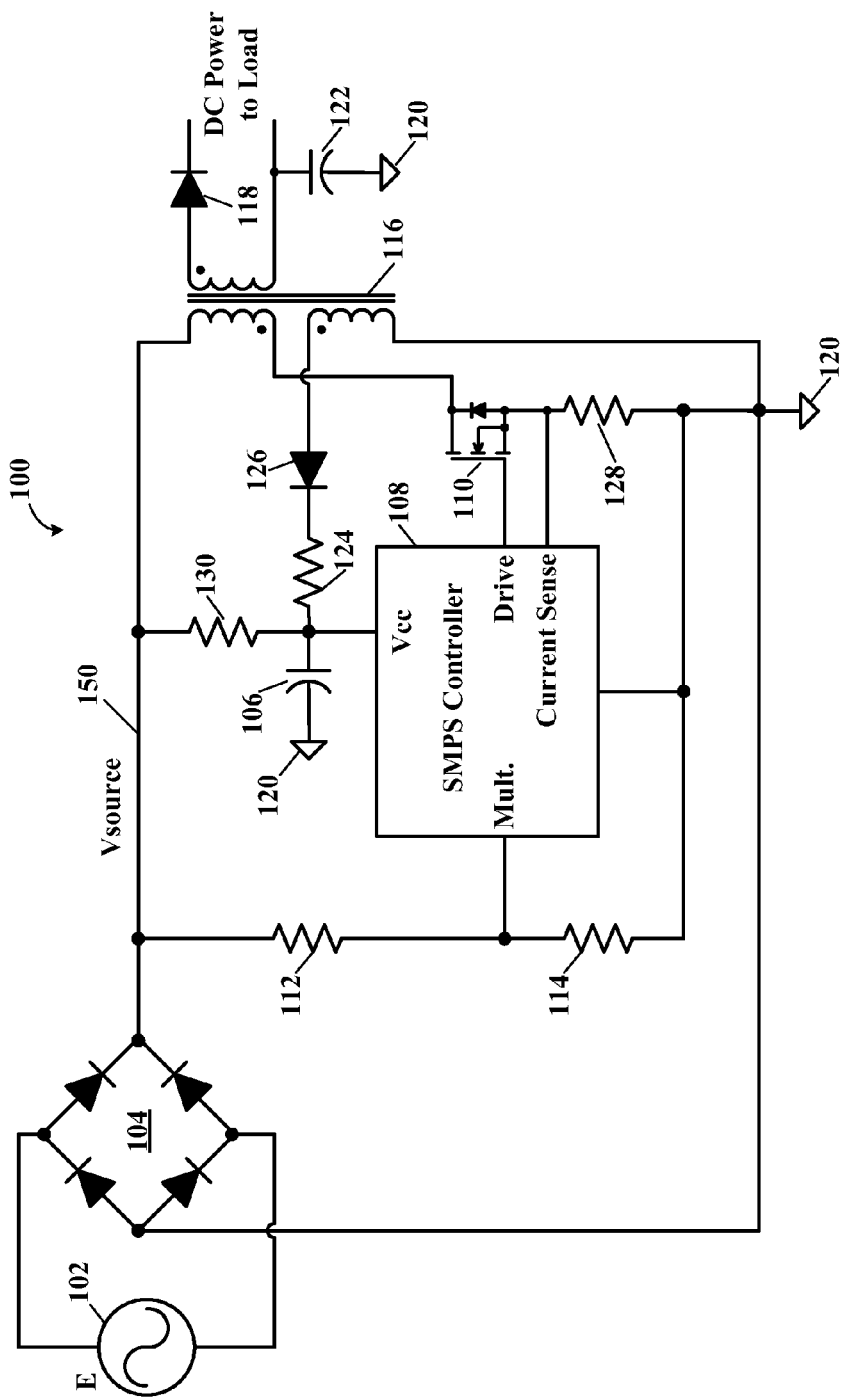
FIG. 1 illustrates a schematic diagram of a power factor corrected (PFC) switch mode power supply (SMPS) having a prior art trickle charge resistor for charging a power source Vcc capacitor.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION OF THE EXEMPLARY EMBODIMENTS

Referring now to the drawings, details of a specific example embodiments of the present invention are schematically illustrated. Like elements in the drawings will be represented by like numbers, and similar elements will be represented by like numbers with a different lower case letter suffix.

Referring to FIG. 1, depicted is a schematic diagram of a power factor corrected (PFC) switch mode power supply (SMPS) having a prior art trickle charge resistor for charging a power source Vcc capacitor. A resistor 130 is used to trickle charge a capacitor 106 that supplies operating voltage, Vcc, to the SMPS controller 108. The SMPS controller 108 typically has a turn on threshold voltage, VTon, and a turn off voltage threshold, VToff, where VTon>VToff. In the case of the L6562 from ST semiconductor, the VTon=12.5V and the VToff=10V.

There are two paths for the capacitor 106 to be charged to Vcc and thereby supply operating voltage to the SMPS controller 108 as follows: 1) The start-up path is a circuit that will charge Vcc above VTon such that the controller 108 will start the power transistor switch 110 switching in the SMPS 100, allowing it to process energy. And 2) the regenerative path must then take some of this energy and provide it to the Vcc capacitor 106 such that the voltage does not fall below VToff. At this point the Vcc supply for the controller 108 is stable and the SMPS 100 transitions into steady state operation. The regenerative path voltage for charging the Vcc capacitor 106 is supplied by an AC voltage from a winding of transformer 116, rectified by a diode 126 and through a current limiting resistor 124. The power transistor switch 110 may be, for example but is not limited to, a bipolar transistor (also called a bipolar junction transistor or BJT), a metal oxide semiconductor field effect transistor (MOSFET), or an insulated gate bipolar transistor (IGBT).

With the trickle charge method, a simple resistor 130 is added from the power source 150 to the Vcc storage capacitor 106 such that when power is supplied from an AC voltage source 102, DC current flows from the bridge diode circuit 104, through the trickle charge resistor 130 and then to charging the Vcc storage capacitor 106. This results in the Vcc voltage increasing until it reaches VTon, at which point the SMPS controller 108 starts switching the power transistor switch 110 on and off so that the desired power is provided from the transformer 116 and power diode 118 to the load, e.g., LED luminaire (not shown), etc. Since the SMPS controller 108 is now drawing energy, the Vcc voltage starts to fall on the Vcc storage capacitor 106 as the SMPS controller 108 drains current from the Vcc storage capacitor 106. As long as the regenerative path (transformer 116 winding, diode 126 and resistor 124) replenishes the energy on the storage capacitor 106 before the Vcc falls below VToff, the SMPS 100 continues to run.

If the AC voltage source 102 stays at a constant voltage level, then the trickle charge resistor 130 may be sized so that the SMPS 100 starts in a reasonable amount of time based upon that voltage level. The lower the resistance value of the trickle charge resistor 130, the faster the capacitor 106 will charge up to over VTon (minimum start-up voltage) by allowing more current to trickle charge into the Vcc capacitor 106.

However, the lower the resistance value, the more power is dissipated during steady state operation due to $E^2/R$ losses in the resistor 130. Therefore, there is an optimal value that equally balances start-up time and power losses.

A problem exists, however, when the brightness of a LED luminaire is controlled by a line voltage dimmer (not shown) that supplies reduced RMS voltage (voltage source 102 is now a light dimmer control). The SMPS 100 may suffer start-up times that are unreasonably delayed when the light switch is switched on with the dimmer control in a reduced light output configuration. This is because the dimmer dims the light by reducing the RMS voltage of the voltage source 102 the SMPS 100 used as a LED driver. When the voltage available from the voltage source 102 is reduced to the trickle charge path through the resistor 130, the amount of current available to charge the Vcc capacitor 106 is reduced resulting in a longer start-up time before reaching VTon. With the dimmer at its minimum setting the start-up time may be as long as five minutes. This is clearly unacceptable to a end user wishing to turn on the lights.

Figure 2:
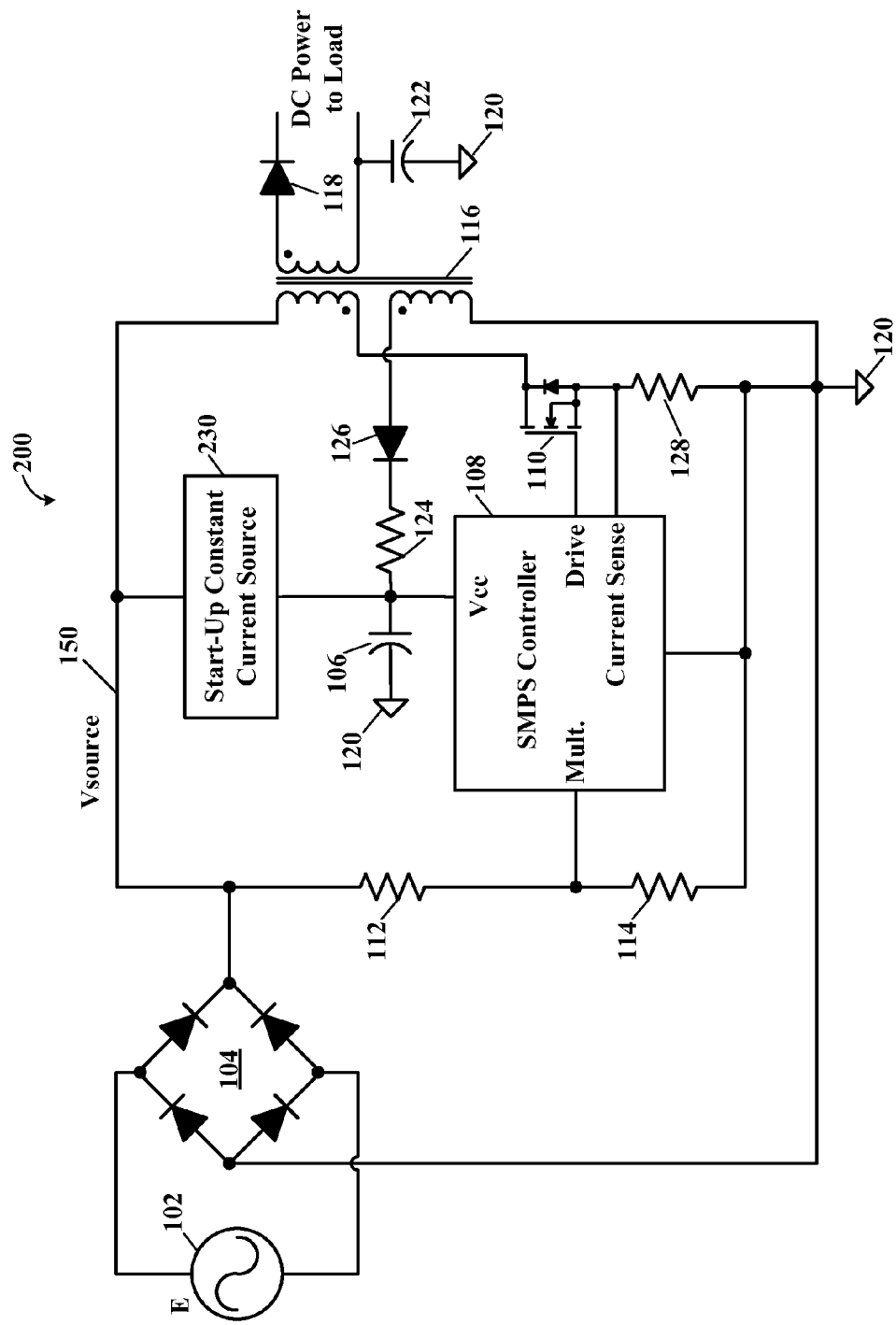
FIG. 2 illustrates a schematic diagram of a power factor corrected (PFC) switch mode power supply (SMPS) having a start-up constant current source for charging a power source Vcc capacitor, according to a specific example embodiment of this disclosure.

Referring to FIG. 2, depicted is a schematic diagram of a power factor corrected (PFC) switch mode power supply (SMPS) having a start-up constant current source for charging a power source Vcc capacitor, according to a specific example embodiment of this disclosure. The SMPS circuit shown in FIG. 2 works substantially the same as the SMPS circuit shown in FIG. 1 and described hereinabove, except that a quick start-up circuit comprising a start-up constant current source 230 replaces the traditional trickle charge start-up path of the trickle charge resistor 130. This quick start-up circuit engages only at start-up of the SMPS 100 and turns off after the SMPS 100 is capable of producing its own regulated power supply. Also, the value of current provided by the current source is substantially independent of the RMS voltage of the incoming power source, resulting is start-up times that are independent of the dimmer setting when the power source is coupled to a dimmer. Vsource is represented by the numeral 150 and a Vsource common is represented by the numeral 120. A resistor 128 coupled between the power transistor switch 110 and the Vsource common 120 may be used as a current sense circuit for measuring current through the power transistor switch 110.

Figure 3:
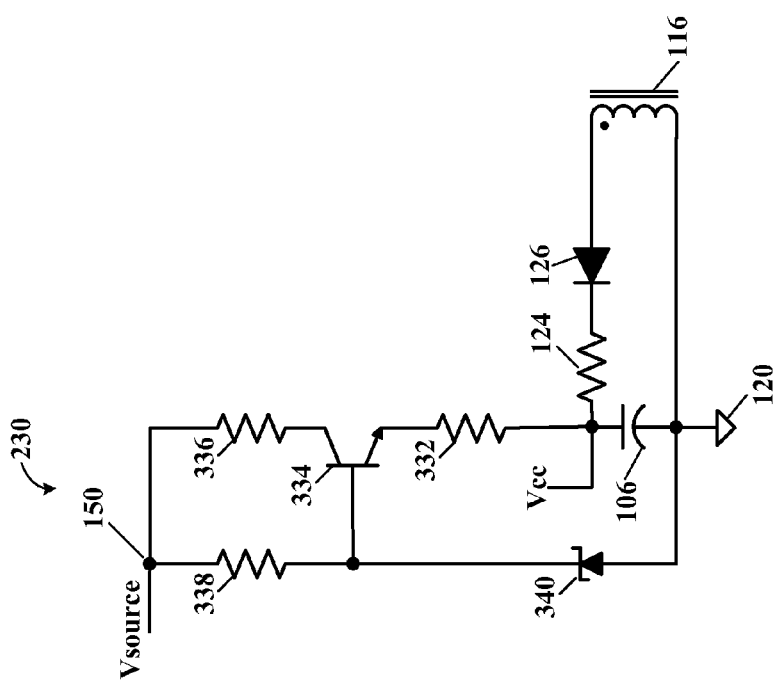
FIG. 3 illustrates a more detailed schematic diagram of the start-up constant current source shown in FIG. 2, according to the specific example embodiment of this disclosure.
Figure 4:
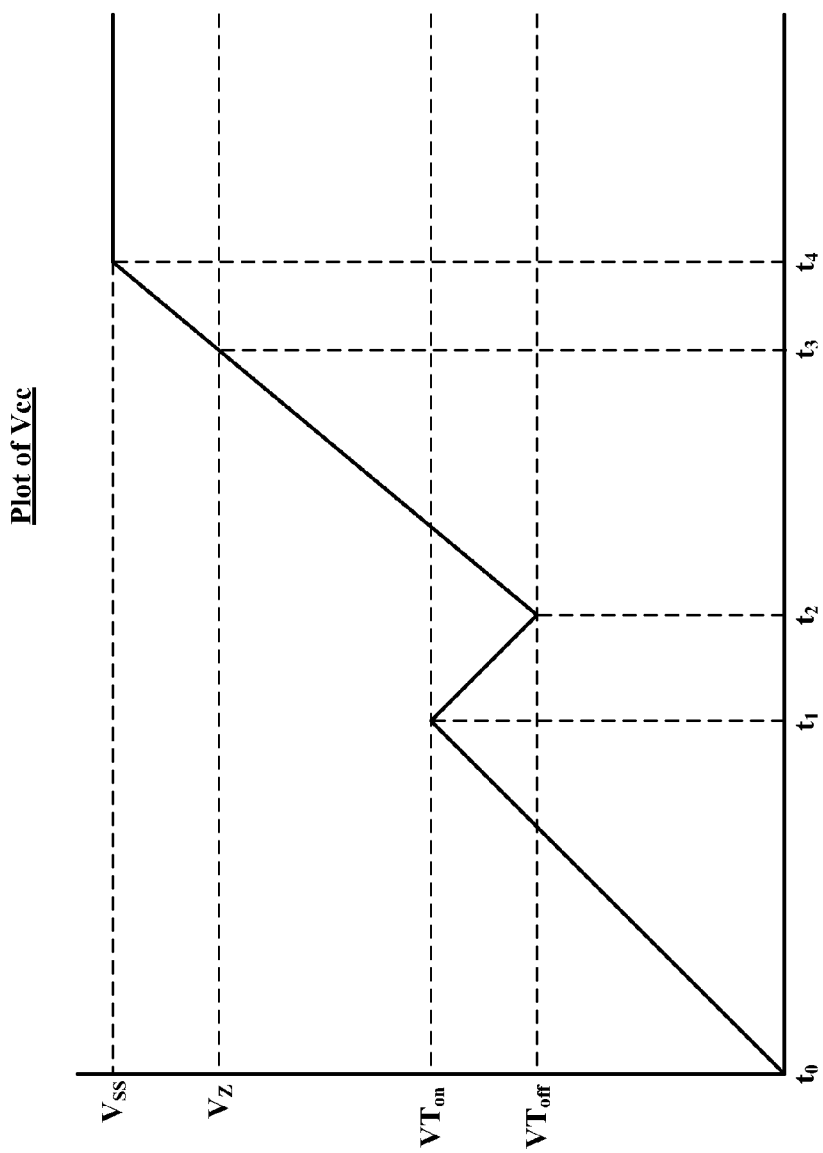
FIG. 4 illustrates a voltage versus time graph of the charging voltage on the Vcc capacitor shown in FIGS. 2 and 3.

Referring now to FIGS. 3 and 4, depicted in FIG. 3 is a more detailed schematic diagram of the start-up constant current source shown in FIG. 2 and depicted in FIG. 4 is a voltage versus time graph of the charging voltage on the Vcc capacitor shown in FIGS. 2 and 3, according to the specific example embodiment of this disclosure. The trickle charge resistor 130 (FIG. 1) is replaced with a constant current source 230 that senses when the regenerative current path is established in the SMPS 100 and turns off the constant current source 230 when the trickle charge is no longer needed due to energy delivered via the regenerative path. With this quick start circuit, when power is applied at time $t_0$, a current path is provided through resistor 338 to bias a zener diode 340. The zener diode 340 has a zener voltage of Vz. With the zener diode 340 biased at Vz, this places voltage Vz at the base of transistor 334, thereby forward biasing the base-emitter junction of the transistor 334. This will place the voltage of Vz-Vd-Vcc across resistor 332 where Vd is the voltage of a base emitter junction, e.g., −0.7V, forcing a controlled current to flow into the Vcc capacitor 106, thereby increasing the Vcc voltage. This current is substantially independent of the incoming RMS voltage of the power source. Once Vcc>VTon at time $t_1$, the SMPS 100 will start switching, generating energy through the regenerative path to maintain Vcc on the capacitor 106. At time $t_2$, the regenerative path current plus the start up current exceeds the current drawn by the SMPS controller 108 (FIG. 2). At time $t_3$, when Vcc is greater than voltage Vz, the base-emitter junction of the transistor 334 becomes reverse biased and the start-up current path shuts off. Now the only current source for charging Vcc is sourced from the regenerative path. At time $t_4$, Vcc has reached the regulated voltage and the SMPS 100 has reached steady state. Therefore, there is substantially no power loss during steady state operation due to the start-up circuitry. Also, since the start-up current is not dependant on the RMS voltage from the voltage source 102, there is substantially no delay when starting up the SMPS 100 from the reduced RMS voltage output from a light dimmer set to its minimum light level.

Although specific example embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

We claim:

1. A switch mode power supply (SMPS) having improved start-up time at reduced input voltage, comprising:
    a rectifier circuit for converting an alternating current (AC) power source to a direct current (DC) power source;
    a SMPS transformer having a primary winding thereof coupled to the DC power source and a controller supply winding for powering a SMPS controller;
    a power transistor switch coupled to the primary winding of the SMPS transformer;
    the SMPS controller having a drive output and a Vcc power supply input, wherein the drive output is coupled to the power transistor switch such that the SMPS controller controls when the power transistor switch turns on or off;
    a Vcc power supply capacitor coupled to the Vcc power supply input of the SMPS controller;
    a first rectifier diode coupled between the controller power winding of the SMPS transformer and the Vcc power supply capacitor; and
    a start-up constant current source coupled between the DC power source and the Vcc power supply capacitor,
        wherein the start-up constant current source provides a constant current charge to the Vcc power supply capacitor until a threshold voltage is reached thereon, then the start-up constant current source shuts off and charging voltage to the Vcc power supply capacitor is supplied by the controller power supply winding of the SMPS transformer through the first rectifier diode.

2. The SMPS according to claim 1, wherein the start-up constant current source comprises:
    a transistor having a collector, base and emitter;
    a zener diode coupled between the transistor base and a DC power source common;
    a first resistor coupled between transistor emitter and the DC power source common;
    a second resistor coupled between transistor collector and the DC power source; and
    a third resistor coupled between transistor base and the DC power source, wherein the threshold voltage is substantially the same as the zener diode voltage.

3. The SMPS according to claim 1, wherein a secondary winding of the SMPS transformer is connected in series with a second rectifier diode and supplies direct current (DC) voltage to a load.

4. The SMPS according to claim 3, wherein the load comprises a light emitting diode (LED) luminaire.

5. The SMPS according to claim 1, wherein the rectifier circuit comprises a full-wave bridge diode circuit.

6. The SMPS according to claim 1, further comprising a current sense circuit for measuring current through the power transistor switch.

7. The SMPS according to claim 6, wherein:
the current sense circuit is a current sense resistor coupled between the power transistor switch and a power source common; and
a current sense input of the SMPS controller is coupled to the current sense resistor and the power transistor switch,
whereby the SMPS controller measures a voltage from the current sense resistor representative of current through the power transistor switch.

8. The SMPS according to claim 1, wherein the power transistor switch is a bipolar transistor.

9. The SMPS according to claim 1, wherein the power transistor switch is a metal oxide semiconductor field effect transistor.

10. The SMPS according to claim 1, wherein the power transistor switch is an insulated gate bipolar transistor.

11. The SMPS according to claim 1, wherein the SMPS is a power factor corrected SMPS.

12. A switch mode power supply (SMPS) controller having improved start-up time at reduced input voltage, comprising:
the SMPS controller having a drive output and a Vcc power supply input, wherein the drive output is adapted for coupling to a power transistor switch such that the SMPS controller controls when the power transistor switch turns on or off;
a Vcc power supply capacitor coupled to the Vcc power supply input of the SMPS controller;
a first rectifier diode coupled between the controller power winding of a SMPS transformer and the Vcc power supply capacitor; and
a start-up constant current source coupled between a DC power source and the Vcc power supply capacitor,
wherein the start-up constant current source provides a constant current charge to the Vcc power supply capacitor until a threshold voltage is reached thereon, then the start-up constant current source shuts off and charging voltage to the Vcc power supply capacitor is supplied by the controller power supply winding of the SMPS transformer through the first rectifier diode.

13. The SMPS controller according to claim 12, wherein the start-up constant current source comprises:
a transistor having a collector, base and emitter;
a zener diode coupled between the transistor base and a DC power source common;
a first resistor coupled between transistor emitter and the DC power source common;
a second resistor coupled between transistor collector and the DC power source; and
a third resistor coupled between transistor base and the DC power source,
wherein the threshold voltage is substantially the same as the zener diode voltage.

14. The SMPS controller according to claim 12, further comprising a current sense input for measuring current through the power transistor switch.

15. The SMPS controller according to claim 12, wherein the SMPS controller is a power factor corrected SMPS controller.

16. A method for improving start-up time of a switch mode power supply (SMPS) during reduced input voltage, said method comprising the steps of:
converting an alternating current (AC) power source to a direct current (DC) power source;
providing a SMPS transformer having a primary winding thereof coupled to the DC power source and a controller supply winding for powering a SMPS controller;
providing a power transistor switch coupled to the primary winding of the SMPS transformer;
coupling a drive output of the SMPS controller to the power transistor switch such that the SMPS controller controls when the power transistor switch turns on or off;
coupling a Vcc power supply input of the SMPS controller to a Vcc power supply capacitor;
coupling a first rectifier diode between the controller power winding of the SMPS transformer and the Vcc power supply capacitor; and
providing a start-up constant current source coupled between the DC power source and the Vcc power supply capacitor, wherein the start-up constant current source comprises the steps of
providing a constant current charge to the Vcc power supply capacitor until a threshold voltage is reached thereon, and
turning off the start-up constant current source once a charging voltage from the controller power supply winding of the SMPS transformer to the Vcc power supply capacitor is greater than the threshold voltage.

17. The method according to claim 16, further comprising the step of measuring current through the power transistor switch.

18. The method according to claim 17, wherein the step of measuring current through the power transistor switch comprises the steps of:
providing a current sense resistor coupled between the power transistor switch and a power source common;
coupling a voltage from the current sense resistor to a current sense input of the high power factor SMPS controller; and
measuring the voltage from the current sense resistor representative of current through the power transistor switch.

19. The method according to claim 16, wherein the power transistor switch is selected from the group consisting of a bipolar transistor, a metal oxide semiconductor field effect transistor, and an insulated gate bipolar transistor.

20. The method according to claim 16, further comprising the step of providing power from the SMPS to a light emitting diode (LED) luminaire.

* * * * *